April 19, 1955   H. DEMORY   2,706,304
BLOCK SCRAPER
Filed July 29, 1950

INVENTOR.
HARRY DEMORY
BY Marvin Moody
atty.

United States Patent Office 2,706,304
Patented Apr. 19, 1955

2,706,304

BLOCK SCRAPER

Harry Demory, Cedar Rapids, Iowa

Application July 29, 1950, Serial No. 176,627

2 Claims. (Cl. 15—93)

This invention relates in general to meat block cleaners and in particular, to a rotary-type scraper.

Blocks used for cutting meat become greasy and covered with meat particles and, therefore, must be periodically scraped. Since particular areas of the block are used more than others the surface of the block becomes uneven and increasingly difficult to clean.

It is an object of this invention, therefore, to provide a rotary-type scraper which has a plurality of flexible members adapted to contact an irregular surface.

Another object of this invention is to provide scraping members that are flexible and curved into an arc for optimum contact with an irregular surface.

Still another object of this invention is to provide cutting blades that are removably attached to a scraper disc.

A feature of this invention is found in the provision of a motor-driven disc formed with depressions for receiving therein a plurality of cutting and scraping members. Each cutting and scraping member passes over an arcuate portion and is divided so that independent movement may occur between adjoining fingers.

Further objects, features, and advantages of this invention will become apparent from the following description and claims when read in view of the drawings, in which:

Figure 1:
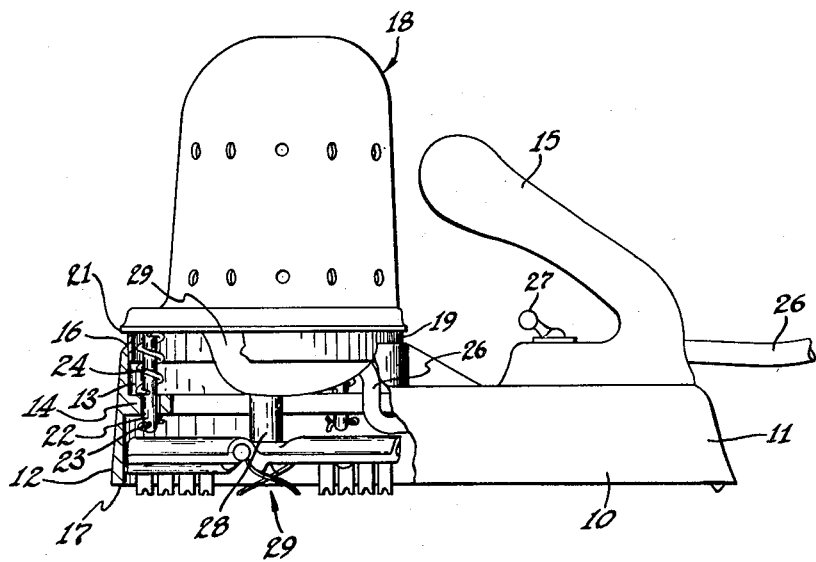
Figure 1 is a cut-away side view of the meat block scraper of this invention.

Figure 1 illustrates the meat scraper of this invention which has a base member 10. Attached to the top of the base member 10 adjacent one end 11 is a handle 15. The opposite end 12 of the base member 10 is formed with an opening 13. An annular shoulder 14 extends inwardly from the base member 10 into the opening 13 intermediate the top 16 and the bottom 17 of the base. An upper housing, designated generally as 18, has a downwardly extending portion 19 that is slidably received in the opening 13 of the base member 10. A shoulder 21 of a generally annular shape extends outwardly adjacent the portion 19 and has a diameter larger than the opening 13 so as to limit the downward motion of the housing 18.

Three pins 22 extend downwardly from the bottom of the housing 18 into the confines of the base member 10 and pass through openings formed in the shoulder 14. Fastening means, as for example, cotter keys 23, are passed through openings formed in the ends of the pins 22 to prevent the housing 18 from being withdrawn from the base member 10. Springs 24 are received on the pins 22 between the shoulder 21 and the shoulder 14 and resiliently support the weight of the housing 18. The pins 22 are equally spaced about the shoulder 14 so that the weight may be equally distributed.

The housing contains an electric motor, not shown. Electric power is furnished to the motor by a flexible cord 26, and a switch 27 is connected in the line to turn the power on and off. It is to be understood, of course, that the cord 26 terminates in a suitable connecter.

A shaft 28 is connected to the motor through a suitable gear reduction contained in the cover 29. The shaft 28 extends down through the opening 13 and beyond the shoulder 14 to terminate above the bottom 17 of the base member. A scraping disc, designated generally as 29, is attached to the end of the shaft 28 and rotates therewith when the motor is energized.

Figures 2, 3:
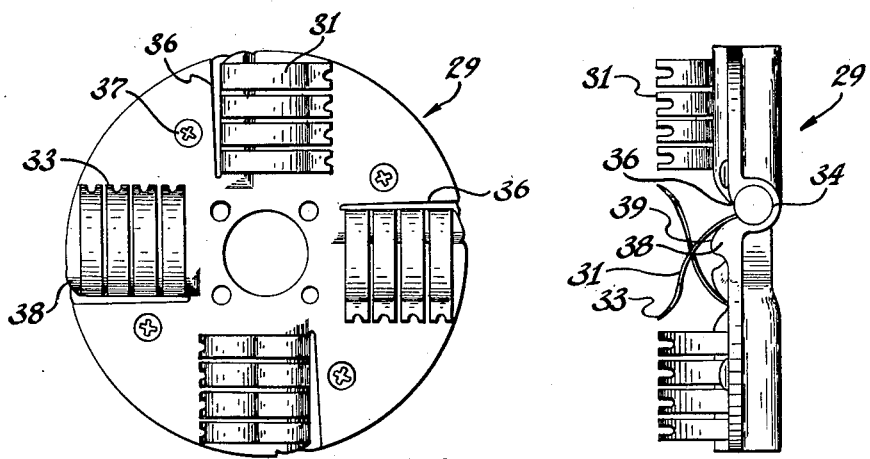
Figure 2 is an enlarged bottom view of the scraping portion of the invention.
Figure 3 is an enlarged side view of the scraping portion of the invention.
Figure 4:
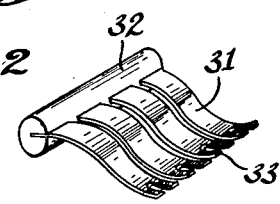
Figure 4 is an enlarged perspective view of the detachable scraping members.

The scraping disc is best shown in Figures 2 and 3. Figure 3 shows a side view of the disc 29 and it has a plurality of flexible scraping fingers 31 detachably mounted thereto. As shown in Figure 4 a plurality of the scraping fingers 31 have one end thereof fastened to a cylindrical member 32 as by casting. The fingers 31 may be made, for example, from spring steel and are of a generally S-shape. The scraping ends 33 of the fingers 31 are bifurcated.

The scraping finger assembly comprising the fingers 31 and holding means 32 are received in openings formed in cylindrical portions 34 formed on the top of the disc 29. A slot 36 is formed adjacent each opening 34 to allow the fingers 31 to extend therethrough. Holding pins 37 extend through the disc 29 and engage the members 32 to rigidly fasten them to the disc. As best shown in Figure 2, the disc receives four equally-spaced finger-holding assemblies. The slots 36 are located forwardly of a radius of the disc 29 so that the ends 33 of the scraping fingers will be placed slightly rearwardly of a radius. Adjacent each slot 36 is formed a support member 38 which has a finger-engaging portion 39, which as best shown in Figure 3, is of a generally arcuate shape for supporting the scraping arms 31. As shown in Figure 3 the scraping arms 31 extend through the slot 36, outwardly and over the arcuate portion 39, and terminate in an outwardly extending portion 33. The particular shape of the fingers 33 are ideally suited for block scraping, and the use of a plurality of scraping arms 31 attached to each scraping arm assembly allows individual movement of the fingers so that they may engage irregular surfaces that are being scraped. When it is desired to replace one of the cutting-arm assemblies the holding pin 37 may be removed and a scraping arm assembly removed radially outwardly from the disc 29. Since the block engaging portions 33 are located rearwardly of the radius of the disc 29, a slight outward force will be exerted upon them and combined with centrifugal force will cause the fingers to engage the surface in an optimum manner.

In operation, the operator places his right hand on handle 12 and his left hand on the top of the housing 18. It is to be understood, of course, that if the operator is left handed he will reverse the position of his hands. The cord 26 is connected to a suitable source of electric power and the switch 27 is turned on and the scraper is ready for use. The base 10 is placed on the surface to be cleaned and the scraping portions 33 will engage the block. The pressure upon the surface may be regulated by the operator's left hand by applying different amounts of pressure to the housing 18. The flexibility of the fingers 31 combine with the springs 24 to obtain smooth regular scraping. The scraper is moved back and forth across the surface of the block to be cleaned until all the surface has been covered. A uniformly smooth, cleaned surface is obtained by this machine without gouging or scarring the surface.

Although this invention has been described with respect to a preferred embodiment thereof, it is not to be so limited as changes and modifications may be made therein which are within the full intended scope of the invention as defined by the appended claims.

I claim:

1. A scraper head comprising, a disc formed with a plurality of generally radial openings, a plurality of slots formed in said disc and communicating with said openings, a plurality of generally cylindrical end fastening portions received in said radial openings, means for locking said end fastening portions, a plurality of flexible fingers of equal length mounted in each end fastening portion and extending out of the openings and slots formed in the disc, and a plurality of arcuate portions on the disc with one adjacent each radial opening and engageable with said flexible fingers.

2. A scraper head comprising, a disc formed with four generally radial openings, four slots formed in said disc and communicating with said openings, four generally cylindrical end fastening portions received in said radial openings, means for locking said end fastening portions, a plurality of flexible fingers of equal length mounted in each end fastening portion and extending out of the openings and slots formed in the disc, and four arcuate portions on the disc with one adjacent each radial opening and engageable with said flexible fingers.

References Cited in the file of this patent

UNITED STATES PATENTS

| | | |
|---|---|---|
| 1,387,027 | Watrous | Aug. 9, 1921 |
| 1,414,305 | Sandblom | Apr. 25, 1922 |
| 1,643,882 | Faiver | Sept. 27, 1927 |
| 1,670,068 | Grimes | May 15, 1928 |
| 2,015,220 | Harkin | Sept. 24, 1935 |
| 2,157,493 | Miller | May 9, 1939 |
| 2,178,169 | Goertzen | Oct. 31, 1939 |
| 2,281,278 | Finnell | Apr. 28, 1942 |
| 2,306,470 | Rush et al. | Dec. 29, 1942 |
| 2,480,739 | Johnson | Aug. 30, 1949 |

FOREIGN PATENTS

| | | |
|---|---|---|
| 729,658 | France | May 2, 1932 |